United States Patent
Roskind

(10) Patent No.: US 8,681,662 B2
(45) Date of Patent: *Mar. 25, 2014

(54) SELF-FORMING NETWORK

(75) Inventor: James Roskind, Redwood City, CA (US)

(73) Assignee: James A. Roskind, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/365,971

(22) Filed: Feb. 3, 2012

(65) Prior Publication Data

US 2012/0269096 A1 Oct. 25, 2012

Related U.S. Application Data

(63) Continuation of application No. 11/395,752, filed on Mar. 31, 2006, now Pat. No. 8,139,508.

(60) Provisional application No. 60/667,333, filed on Mar. 31, 2005.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/50 | (2006.01) |
| H04Q 11/00 | (2006.01) |

(52) U.S. Cl.
USPC .......................................... 370/255; 370/400

(58) Field of Classification Search
None
See application file for complete search history.

(56) References Cited

PUBLICATIONS

Hu, Jingfeng; Li, Ming; Zheng, Weimn; Wang, Congshen; Ning, Ning; Dong, Haitao, SmartBoa: Constructing p2p overlay network in the heterogeneous Internet using irregular routing tables, IPTPS 2004 : international workshop on peer-to-peer systems No. 3, La Jolla CA , Feb. 26, 2004, pp. 278-287.*

Dahlia Malkhi, Moni Naor, David Ratajzcak, Viceroy: Scalable Emulation of Butterfly Networks for Distributed Hash Tables, Nov. 11, 2003, pp. 1-16.*

Ion Stoica, Robert Morris, David Karger, Frans Kaashoek, Hari Balakrishnan, Chord: A Scalable Peer-to-peer Lookup Service for Internet Applications, SIGCOMM 2001, Aug. 27-31, 2001, pp. 1-12.*

Nicholas J. A. Harvey, Michael B. Jones, Stefan Saroiu, Marvin Theimer, Alec Wolman, Skipnet: A scalable overlay network with practical locality properties, Microsoft Research Publication, 2003, pp. 1-14.*

(Continued)

*Primary Examiner* — John Blanton
*Assistant Examiner* — Christopher Crutchfield
(74) *Attorney, Agent, or Firm* — Mahamedi Paradice Kreisman LLP

(57) ABSTRACT

A connected computer may be operated as node by inspecting communications from other nodes that pass through that node. From the communications, two or more pointers may be determined for the given node. These pointers may include a first pointer identified by a default designation that links the given node to a first node in the network, and a second pointer to another node. The second pointer may be identified by a determination that a designated criteria has been satisfied after the given node is placed on the network.

20 Claims, 7 Drawing Sheets

(56) References Cited

PUBLICATIONS

Kumar, A.; Merugu, S.; Jun Xu; Xingxing Yu, Ulysses: a robust, low-diameter, low-latency peer-to-peer network, Network Protocols, 2003. Proceedings. 11th IEEE International Conference on, vol., No., pp. 258-267, Nov. 4-7, 2003.*

Haiying Shena, Cheng-Zhong Xua, and Guihai Chenb, Cycloid: A constant-degree and lookup-efficient P2P overlay network, Elsiver Publicaitons, Feb. 26, 2005, pp. 1-13.*

* cited by examiner

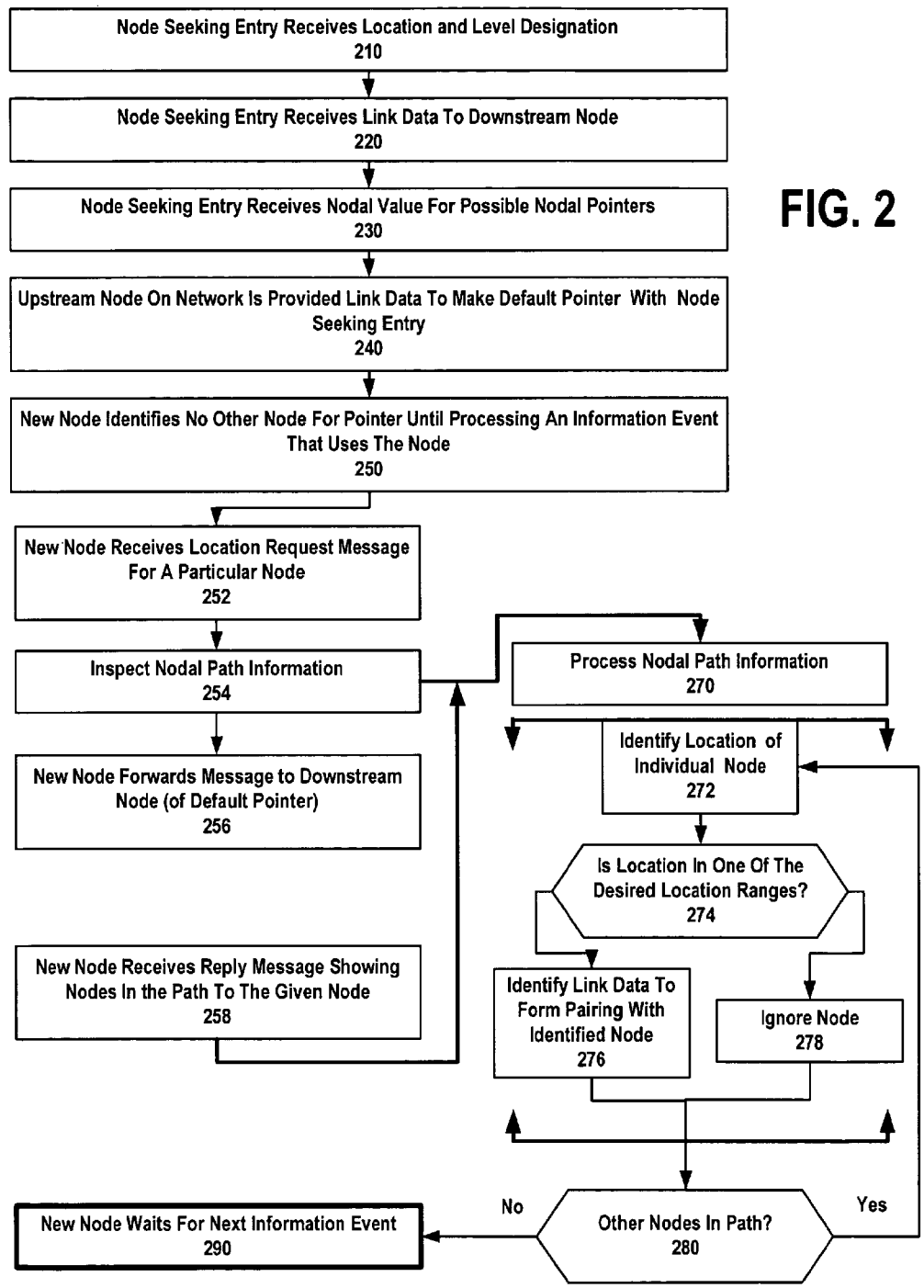

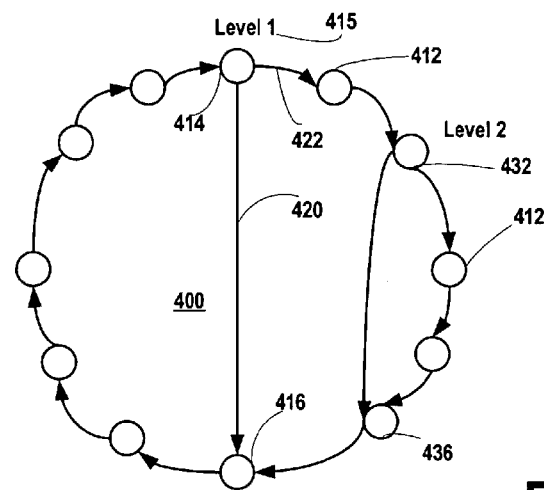
FIG. 4
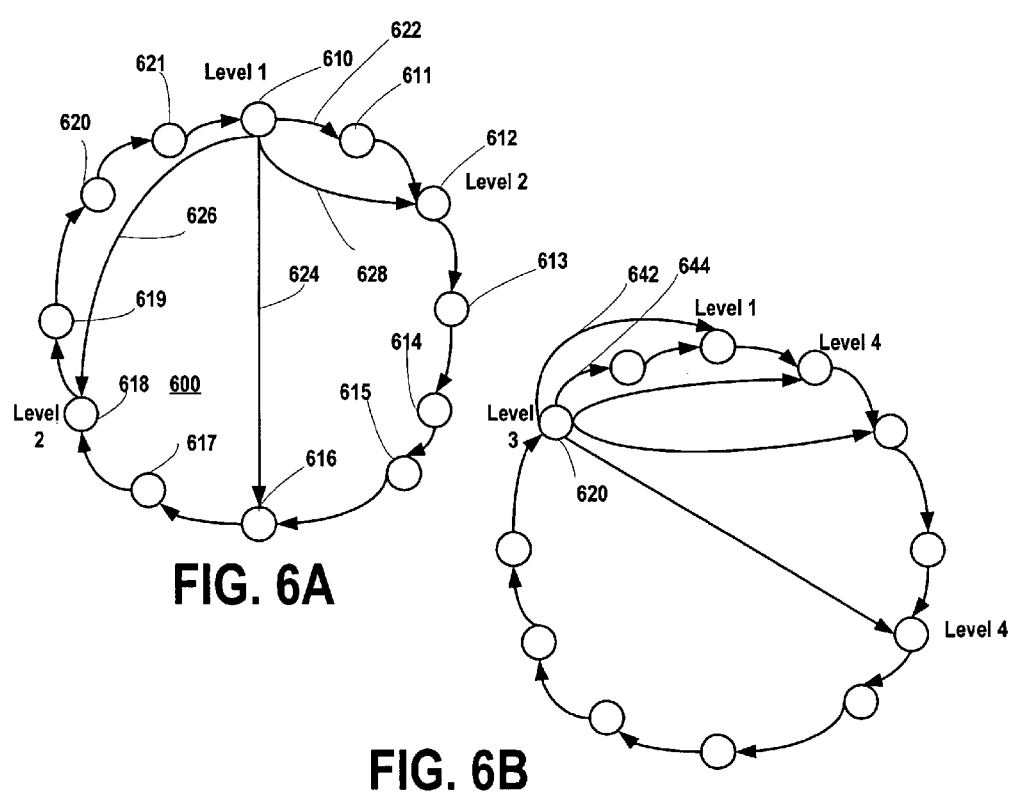
FIG. 6A
FIG. 6B

SELF-FORMING NETWORK

RELATED APPLICATIONS

This application is a Continuation of U.S. patent application Ser. No. 11/395,752, filed Mar. 31, 2006 now U.S. Pat. No. 8,139,508 which claims benefit of priority to U.S. Provisional Application No. 60/667,333, filed Mar. 31, 2005; all of the aforementioned priority applications being hereby incorporated by reference in their entirety for all purposes.

TECHNICAL FIELD

The disclosed embodiments relate generally to the field of self-forming networks and overlay networks.

SEQUENCE LISTING

Attached is a set of computer listings on a CD-ROM, which is hereby incorporated by reference in this application. The CD-ROM incorporated by reference contains the following files:

|  | Size | Creation Date | File Name |
|---|---|---|---|
| -r-xr-xr-x 1 | 850 | Mar 30 15:25 | UnresponsiveNodeError.py |
| -r-xr-xr-x 1 | 403 | Mar 30 15:25 | defaults.py |
| -rwxr-xr-x 1 | 1560 | Mar 30 15:30 | grepit |
| -r-xr-xr-x 1 | 15825 | Mar 30 15:25 | info.py |
| -r-xr-xr-x 1 | 2020 | Mar 30 15:25 | key.py |
| -r-xr-xr-x 1 | 33345 | Mar 30 15:25 | network.py |
| -r-xr-xr-x 1 | 83032 | Mar 30 15:25 | node.py |
| -rwxr-xr-x 1 | 345 | Mar 30 15:26 | runit |

The files are predominantly Python language source code that provides simulations of a variety of self forming networks using various algorithms.

To run the simulation a user should:
 a) Install Cygwin on an MS Windows platform, including the Python module. Python version 2.4 is sufficient.
 b) Run Cygwin, which is an open source Linux like shell that runs on MS Windows
 c) Execute the shell script "runit" as provided above The result will be statistical summaries of the simulations in ASCII, including graphs, averages, and totals, which by default are executed for successively larger and larger networks. If the output is redirected into a file, then the shell script "grepit" can be run to process that file and further summarize the statistical results of the simulations.

The file "defaultst.py" can be modified to cause the simulations to start or stop with specific sized networks, proceed to change network sizes between simulations at a specified rate, or to use different implementations of nodes algorithms.

The file "network.py" is the main level control file for the simulation, directing all global actions and recording statistics before, during and after processing. It arranges for the creations of a set of node objects, sequentially joins them into to a self forming network, performs a series of searches in the network to allow the network to lazily adapt while performance is measured, optionally causes the departure of some nodes, and finally perform a series of searches to monitor network performance and adaptation rates.

The file "node.py" provides the detailed implementation of a variety of different node performance algorithms, clarifying details of many embodiments presented in this specification. The various implementations and algorithms are defined as derived classes, with various derived classes having different characteristics. Detailed program code in these classes demonstrates some specific algorithms for routing various messages through the network, and allows the benefits to be visible in the higher level statistical summaries. Settings in the "default.py" may be used to select the class of nodes that will be simulated.

The file "info.py" provides an abstract implementation for providing a variety of node path information to nodes along with messages that are passed through the network.

The file "key.py" provides an abstract representation of nodal locations which define positions of nodes on a ring network.

The file "UnresponsiveNodeError.py" is a Python exception class, which is used to model and process node departures.

BACKGROUND

Overlay networks, formed by a subset of nodes in a larger network, are increasingly popular to enable numerous types of applications, including consumer-related applications. For example, with the advance of broadband Internet connectivity, individuals can use Internet services that use the end-user's computer to run communication and file sharing applications. At the same time, the service providing this functionality can also perform background utility operations that also use a portion of the user's computer resources for purpose of supporting the network infrastructure. For example, the user's computer can act as a node that interconnects other nodes for purpose of relaying communications. Such overlay networks commonly serve as a backbone many peer-to-peer applications, facilitating the exchanging voice and other data.

BRIEF DESCRIPTION OF THE DRAWINGS

FIG. 2 illustrates a method by which a recently added node in a network procures additional pointers with other nodes, for purpose of facilitating path traversals to locate other nodal values when subsequent location or request messages are received, under an embodiment of the invention.

FIG. 4 is a simplified illustration of a ring network in which a given node is provided both a default and an assignment level pointer to other nodes, under an embodiment of the invention.

FIG. 6A illustrates a node network with the pointers described in a method of FIG. 5, according to one or more embodiments.

FIG. 6B illustrates a variation in which a non-level node includes a link to a high level node, under an embodiment.

DETAILED DESCRIPTION

Figure 1A:
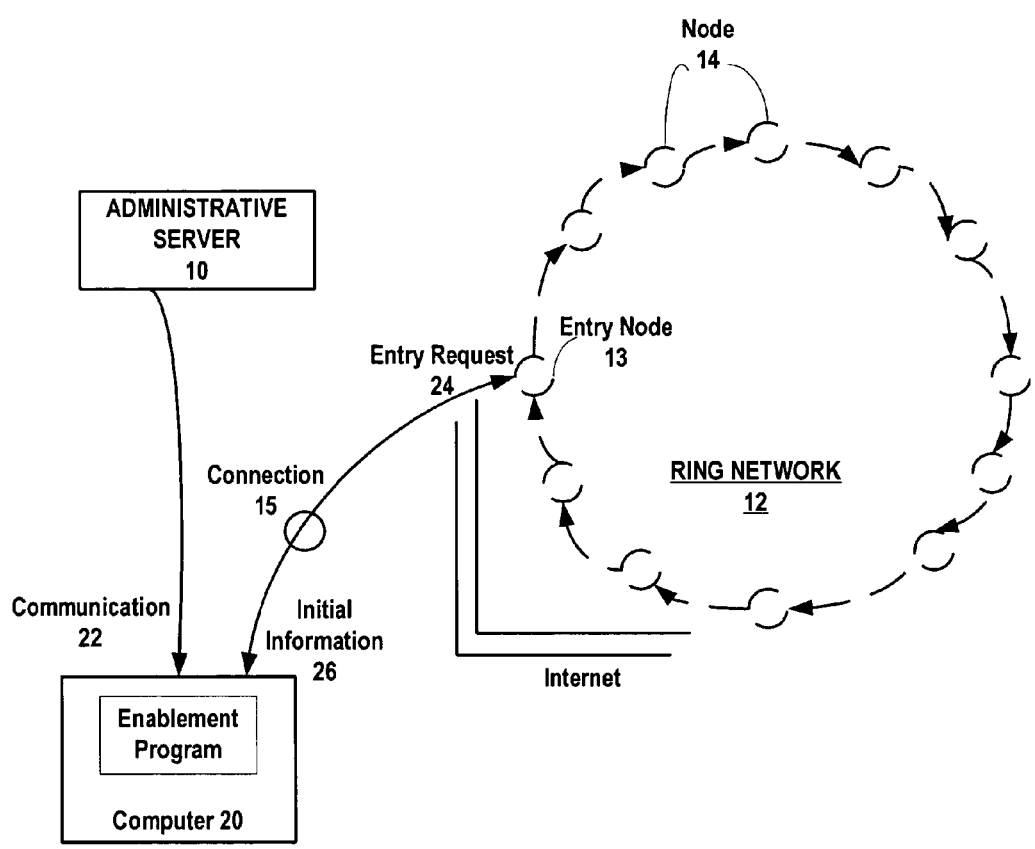
FIG. 1A illustrates an architecture for use in enabling a given computer to participate as a node in multi-node network, under an embodiment of the invention.

Embodiments described herein provide for a self-forming overlay network, in which connectivity from any one point to another is established as needed. A scheme is provided in which nodes can establish pointers to other nodes, for purpose of (i) forwarding messages to each other to expedite traversal of a message to its destination, and/or (ii) enable the node to procure information about other nodes on the network for use in identifying points for future path traversals.

One or more embodiments are described for the use of a node in a self-forming network, where new nodes are added and assimilated into the network. According to an embodiment, individual nodes join the network, and establish pointers to other nodes, either at an initial time (e.g. default pointer) or subsequent to their joining the network. A node of another node's pointer may satisfy a criteria or condition that is determined or evaluated on that other node.

In one embodiment, nodes behave lazily in developing pointers to other nodes. In particular, nodes develop pointers through the inspection of nodal path information contained in node-to-node communications that pass through the node, as opposed to active processes to seek out and establish such pointers. As used herein, the term "lazy" or "lazily" means that the node is able to procure its information through inspection of communications that pass through the node for other purposes. Examples of communications that pass through a node for other purposes include searches for nodal values, for example when nodal values are used as hash values, and the network is providing support as a dynamic hash table. In such an example, nodes may provide storage and retrieval of name-value pairs, where the name is hashed to a nodal value, and a node that has a nodal value closest (clockwise) to that hashed value. The primary reason for the communications in that example would be to acquire or set a name/value pair, and the intermediate nodes along the traversal path may lazily or opportunistically used information embedded in such requests and responses to establish or improve the quality of their pointers. As a second example, communication that is instigated by a new node to join a network may result in the setting of a default pointer in that new node, but may provide information that is lazily, or opportunistically, used by a third party nodes to establish or improve the quality of that third party's pointers.

One or more embodiments also enable nodes to adapt dynamically while being on the network. In particular, the nodes connectivity, links and pointers may be adapted as the node inspects communications passing through it. The adaptation may be performed to improve the node's connectivity (e.g. as based on a predefined criteria for what a good pointer is) and also to handle disruptive network events (i.e. node departures).

Embodiments described herein enable a connected computer to be operated as a given node of an overlay network. In one embodiment, a nodal location and a node classification of the given node is determined. A nodal location of another node is identified by a default pointer to the given node. Activity that passes through the node is monitored for information corresponding to a nodal path (the list of nodes that a message traveled through, along with information about those nodes, such as node levels and nodal locations), where the nodal path is used to handle different communication requests involving other nodes in the path. From the activity, at least one other node may be identified, having a nodal location that satisfies a predefined criteria for a second pointer of the given node on the network.

In one embodiment, the node classification corresponds to a node level. In some embodiments, node levels are positive integers. The node level indicates a range of values for the nodal location of one or more other nodes in the network that satisfy the predefined criteria.

According to another embodiment, a connected computer may be operated as node by inspecting communications from other nodes that pass through that node. From the communications, two or more pointers may be determined for the given node. These pointers may include a first pointer identified by a default designation that links the given node to a first node in the network, and a second pointer to another node. The second pointer may be identified by a determination that a designated criteria has been satisfied after the given node is placed on the network.

Another embodiment includes a computer, and/or a program for configuring a computer. In one embodiment, a program is configured to make the computer behave as a first node in a multi-node network in which a plurality of nodes are interconnected in a sequence. Additionally, the program may be configured to communicate with one or more other nodes in the network to: (i) determine a node classification (N) and a first nodal location of the first node, wherein the node classification represents a designation of a range of nodal locations of the plurality of nodes; (ii) establish a first link to a first node in the network based on a default rule; and (iii) establish a link to a second linked node in the network based on a rule that defines the second link to be a pointer with any node that has a nodal location that is separated from the first nodal location by a distance that is within the range represented by N.

In the context of a ring or looped network, the term "distance" as in "the distance between nodal location A and nodal location B" means the clockwise difference in their values assuming the range of all allowable nodal locations were placed on a circle. For example, this assumes that a nodal location at the upper limit of allowed nodal locations would be treated as equivalently placed, or separated by zero distance, from a nodal location and the lower limit allowed nodal locations. For example, nodal locations may be defined to be anywhere in the range from greater than 0 to less than 1. In that example, the distance between a nodal location of 0.4 and 0.5 would be 0.1. In contrast, the distance between a nodal location of 0.5 and 0.4 would be 0.9. Similarly in that example, the distance between a nodal location of 0.9 and 0.1 would be 0.2. In addition, if two nodal locations are identical (or equivalent), then the distance between them is defined as zero.

As used herein, the term "pointer" means, at minimum, data for enabling one node to communicate with another node. The content of a pointer may differ depending on implementation and design of a particular embodiment. In one embodiment, for example, information contained in a pointer to a node includes an effective address for communication, as well as the level or classification of the node, and the nodal location of the node. A pointer is not bi-directional, unless specified otherwise. For example, in an Internet Protocol network, a pointer to a second node may consist of an IP address of the second node, along with a port number and protocol on which the second node is accepting communications.

Methods, steps of methods, processes, sub-processes and techniques may all be programmatically implemented or facilitated by embodiments of the invention. In this regard, one or more embodiments described herein may be implemented in whole or in part through the use of instructions that are executable by one or more processors. These instructions may be carried on a computer-readable medium. Machines, devices, processors, and other programmatic components shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

As used herein, the term "programmatic", "programmatically" or variations thereof means though the use of computer-implemented instructions.

Node Join

FIG. 1A illustrates an architecture for use in enabling a given computer to participate as a node in overlay multi-node network (commonly referred to as overlay network), under an embodiment of the invention. As shown by FIG. 1A, a given computer 20 (shown as a desktop computer) may be configured to become a node on an overlay network. The given node has connectivity 15 to the overlay network 12, through for example, an Internet connection 15. Alternative computing devices, such as laptop computers, or mobile computing devices such as cellular phones, multi-function devices, smart phones and hybrid devices may alternatively be used. Thus, for example, Internet connection 15 may be established through a cellular network that accesses the Internet. Furthermore, networking and telecommunicating resources other than the Internet may be used to establish connectivity.

In order to initiate use of the computer 20 as a node, the user may sign-on to a service for example, or alternatively simply open an application or even just log-on to a desktop computer. Under one implementation, administrative server 10 may communicate with the computer 20 to provide it information for entry into the network 12. In some embodiments, computer 20 may be preconfigured with information for entry into network 12. For example, the preconfiguration may be provided with a software distribution, or preconfiguration may be acquired during previous participation in the network 12. The processes, operations and functionality performed by the computer 20 in order to enable it to perform as a node may be provided by a program, application or instruction set, which in an example of FIG. 1, is shown as enablement program 25. The enablement program 25 may be provided in various forms, such as, for example, a stand-alone application, a utility application, or a sub-routine or process of another application. As will be described, the enablement program 25 may handle initial communications with the network 12 for purpose of establishing the computer 10 as a node on the network. Subsequently, the enablement program 25 may perform processes for purpose of enabling the computer 20 to behave as a node in the network 12, such as described with FIG. 2, FIG. 3, FIG. 5 or FIG. 7.

In one embodiment, the nodes on the overlay network 12 are logically oriented to form a ring or looped network. The logical orientation may be achieved by assigning each node a numerical identifier, which is sometimes referred to as a nodal or node location. In that example, nodes on the ring may be progressively ordered from a smallest through a largest numerical identifier, with a pointer from each node to the successively larger node, and with a final pointer held by the node with the largest value that points to the node with the smallest value (completing the ring). In one implementation, each node in the network is assigned a name value pair, which may include (i) character-based identifier of the node, and (ii) numerical identification of the node. The name value pair may also include an Internet Protocol address for the computer. The nodal location may correspond to a hash value. In some embodiments, each node may be responsible for maintaining a portion of a distributed hash table, for example maintain some name value pairs for some range(s) of nodal values. For example, each node may maintain a portion of a global hash table for which hash values are between the nodal location of the given node and the nodal location of the default pointer (the next node in the ring). For purpose of description, individual nodes are shown to have a nodal location corresponding to a hash value between 0 and 1. The numerical identifier may represent a logical node location.

In a ring or loop formation, the nodes are sequenced, each node points to one other node, each node is pointed to by exactly one other node, and all nodes in the network are part of one sequential ring. For simplicity, embodiments described herein assume the network 12 has a typical ring or loop architecture, where nodes are sequenced, and their respective nodal location correspond to the sequence. In such a configuration, one embodiment provides that each node in the network points to its adjacent node in the sequence, with the node with the largest sequential value pointing to the node with the smallest sequential value. In one embodiment, such a pointer between nodes is a default pointer, implemented as a rule by the enablement program 25, or by other nodes 14 on the network 12. Numerous alternatives are possible, such as where the server 10 provides the default pointers or rule for making such pointers. As will be described, once the node joins the network, it may be configured to acquire more pointers, based on criteria carried by the program and/or communicated from the server 10.

Basics of Nodal Network

The network 12 has individual nodes 14 with certain characteristics and properties. Under an embodiment, these characteristics and properties may be obtained from other nodes in the network, although it is possible for some of the information to be procured from other sources, such as the server 10, or from the computer's recording of a previous network session. These characteristics and properties include (i) nodal location and identification, (ii) monitored or connected resources, (iii) categorization assignments, and (iv) pointers with other nodes. As described above, nodal location and identification may correspond to a name value pair, which, under one embodiment, may include a hash value that defines the nodal location on the network 12. The monitored and connected resources may include, for example, (i) the Internet Protocol (IP) addresses of computers or nodes on the network 12, (ii) resources to support the network, such as processing and memory resources, and (iii) data resources, including files, folders etc.

Categorization assignments result in a node behaving in a particular way, such that the node conforms to a particular class. As described with, for example, an embodiment of FIG. 3, one type of categorization is a level assignment. Each node may be assigned to a level. A node's level assignment may have several consequences, such as the node seeking out, and then using as necessary, one or more linked nodes, where the linked nodes satisfy criteria of the level. Under one implementation, a node is separated from its linked node by a nodal location separation value that satisfies a particular criteria of the level. The nodal location separation value may represent a portion of the total nodal location range of network 12. For example, in an implementation where a hash value function is assigned for each node having a value between 0 and 1, a "Level 1" node may have a pointer to a second node having location value that differs from the first node's location value by approximately 0.5, or alternatively, a difference range of 0.5 to 1.0. A "Level 2" node may have a pointer to a second node having location value that differs from the "level 2" nodes location value by approximately 0.25, or alternatively, a difference range of 0.25 to 0.5. As used herein, the term "differ" or "difference" (or "distance") with regard to location values of nodes in a ring network having values in a range from a to b, such as from 0 to 1, what is meant is the arithmetic difference between the values, adjusted to a positive difference. Such an "adjustment" may consist of optionally adding the value of "b-a" to create a positive difference, corresponding to a distance around the ring.

For example, if node values are in the range of 0 to 1, then the distance between a node having value 0.25 and a node having value 0.5 is exactly 0.25. In contrast, the distance between a node having value 0.5 and a node having value 0.25 is exactly 0.75. In the latter example, it was necessary to add 1 (=1−0) to the arithmetic difference of −0.25 to arrive at a positive distance value. In one implementation, a node in the network may estimate the number of other nodes in the network based on the distance between a node and the default next node on the ring. For example, if nodal locations are all in the range of values between 0 and 1, a node may estimate the total number of other nodes in a network by taking the reciprocal of the distance to a next node on the ring.

For example, when nodes have nodal values in the range of 0 and 1, then a node having nodal location of "0.1" followed by a node having nodal location "0.2", may estimate the size of the network to be 10 nodes (=1/(0.2−0.1)). In one implementation, the integer number of allowable levels used in an individual node 14 in the network 12 may be computed based on the $\log_2$ of the estimated number of nodes N in the network, where that estimate for network size N is computed by the individual node. Thus, a node that estimates the network to be a 100 node network may be allowed to have any of 6 (=floor ($\log_2(100)$)) levels, and a node that estimates a size of a one million-node network may be allowed to have any of 19 (=floor(log 2(1,000,000))) levels. In those example calculations, floor(x) is the largest integer less than x. In one implementation, the maximum number of allowable levels in the network may be computed by a node that estimates the network size to be N nodes by evaluating $\log_2(N)-\log_2(\log_2(N))$. In one implementation, the maximum allowable levels in a node of a network may be computed to be in a range between $\log_2(N)$ and $\log_2(N)-\log_2(\log_2(N))$.

In one embodiment, each node's pointers to other nodes defines connectivity amongst individual nodes. In an embodiment, some pointers may be determined by rule, condition or criteria, in a manner such as described with FIG. 3 or FIG. 5. The programmatic implementation of the rule, condition or criteria that causes such a paring may be detected and made through use of enablement program 25, as installed and operated on each node in the network. An individual node 14 in the network 12 may have multiple pointers, with each pointer corresponding to a link with another node by which one node can send the other node a message. As mentioned, the link should be assumed as unidirectional, unless stated otherwise. For example, a location request message may only travel one direction amongst individual pointers of two nodes.

In one embodiment, there are two types of pointers: default pointers and criteria-based pointers. Default pointers may be specified by rule or precondition, and effect the node when it enters the network 12. In one implementation, the default pointer assigned to any given node is to an adjacent node in a sequence reflected by the node locations. For any given node, its default pointer defines a recipient node for a message or request when the use of criteria-based pointers is not possible. Criteria based pointers, on the other hand, may be based on factors such as nodal locations and node level. Under one implementation, for example, a pointer between a Node A and a Node B may be based on the following criteria: (i) Node A has a level ranging between 1 and N (where N may correspond to, for example, the log of the overall node size of the network), and (ii) Node A and Node B have a nodal location separation value that is in a range defined by the level. Such a pointer is provided with level assignments, as described below.

Nodal Introduction and Assimilation into Network

Given the context of the overlay network 12, one embodiment provides that the server 10 may provide an initial communication 22 to the computer 20. The communication 22 carries identification of an entry node 13 for the computer 20. In one embodiment, entry node 13 may have been recorded by computer 20 during a prior connection to network 12. In one embodiment, an entry node 13 may be preconfigured into software run on computer 20. Once the entry node 13 is identified to the computer 20, the computer 20 sends the entry node 13 an entry request 24. In response to receiving the entry request 24, the entry node 13 initiates network processes that return initial information 26 for introducing the computer 20 as a node in the network 12. In providing the initial information 26, the entry node 13 combines with other nodes in the network 12 to perform processes that determine the information 26. In one embodiment, at the time of entry, the information 26 may include (i) the computer's nodal location, (ii) information defining or pertaining to its default pointer, and (iii) the level (or other category) assignment for the computer on the network 12. The computer's nodal location may be determined using processes such as described below, and with FIG. 2. The information pertaining to the default pointer may be based, at least in part, on the computer's nodal location. For example, under one embodiment, the computer 20 is linked by a default rule to its downstream, adjacent neighbor, as identified by its nodal location.

In one embodiment, the level assignment for a node may be pseudorandomly determined, based on an understanding of the number of allowable levels the node has calculated. For example, if a node has calculated that the maximum allowable level is L, then a large pseudo random integer S may serve as a seed and may be reduced modulo L, and then incremented by 1, to establish the level for that node in the range of 1 to L. In one embodiment, the contributions to a pseudorandom seed S may be provided by the node that is establishing the level, for example by using combining a network address and other sources of randomness, such as the time of day in seconds since 1970. In one embodiment, contributions by a node to a seed S that was used in calculating its level must be committed to before any additional contributions to S are made by other nodes. For example, contributions by a node may be included in a communication requesting a join of a network, such as the initial communications made by a node to an entry node 13. In one embodiment, some contributions of a seed S may be specified by other nodes in the network, such as the entry node 13, a node that initially had a default pointer to the node, a node that initially was pointed to by the node as a default, by some of nodes that assisted in establishing a nodal value for the node during the initial join. Contributions to a pseudo random seed S may be accumulated using a cryptographic hash function, such as MD5, or SHA-512, etc.

Once on the network 12, the computer 20 manages and makes available certain resources for use by nodes, or by computers that communicate to the nodes 14. Examples of such resources include IP addresses of computers, files, lists, data, and processing and memory resources.

Figure 1B:
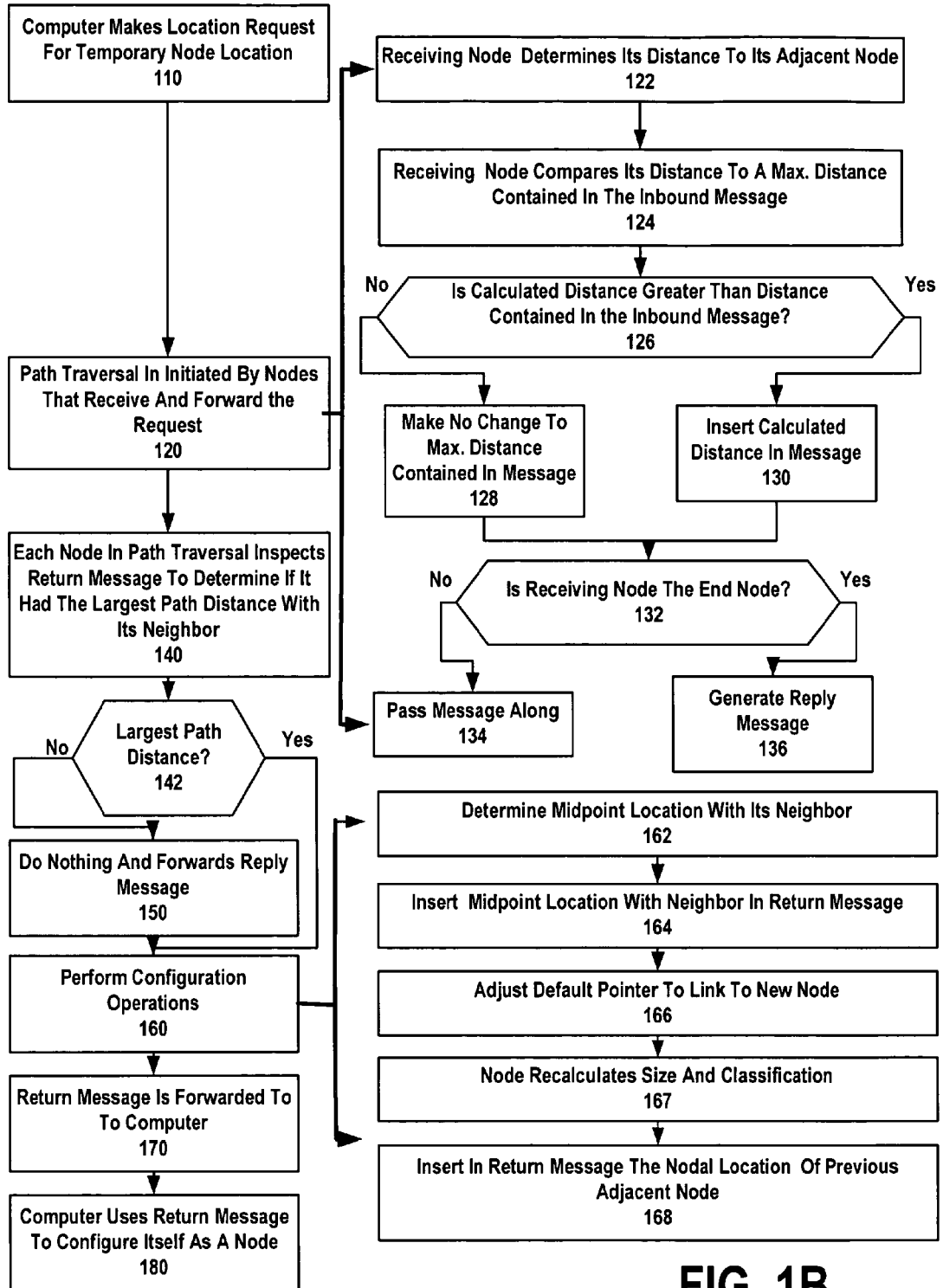
FIG. 1B illustrates one technique for which nodes on a ring network determine the node location for a new node, according to an embodiment of the invention.

There are numerous techniques and algorithms for providing a new node with a node location on a loop or ring network. For example, a node that is joining a network may pseudo randomly select a nodal location that it will use, or alternatively, one or more nodes in a network may compute and propose or require that the joining node use a given nodal location. Several of the routing algorithms described perform better when the nodes are evenly distributed, with respect to the range of nodal locations. In one embodiment, selection of a nodal location by nodes in the network may lead to more even distributions of nodal locations. In one embodiment, selection of a nodal location by nodes on the network 12 may be used to impede a malicious node from selecting a potentially more damaging position in a ring. As such, techniques or methods by which more even distribution of nodes on the network 12 can be made are desirable. FIG. 1B illustrates one technique for which nodes on a ring network determine the node location for a new node, according to an embodiment of the invention.

In step 110, computer 20 provides in its entry request 24 includes a contribution to a temporary, initial node location for use with a location request message. This node location may be generated by random and/or through design by the server 10, the enablement program 25, and/or the network 12 (e.g. entry node 13). The generated node location is not intended to specify a node location for the joining node, but rather, cause a nodal path traversal, starting with entry node 13. As such, the initial location request message is a "faux" request.

Accordingly, step 120 provides that a set of nodes in the network 12 handle the request by receiving the location request and forwarding it on to another node, so as to initiate a path traversal to an end node that handles the node location specified in the entry request 24. The path traversal is complete when an end node is found that either has the generated node location, or has a location that has the closest prior node location to the generated node location. By "closest prior location to the generated node location", what is meant is that the default pointer from that node points to node that has a greater distance to the generated node location. Stated differently, if a node were created with the generated node location, then it would be placed on the ring just after the end node of the path traversal.

As a sub-step 122, when the location request message generated from entry communication 24 is inbound (i.e. it is on its way to the end node), a particular receiving node performs a step of identifying its default nodal distance. The default nodal distance is the difference between a node's nodal location value and the nodal location of the node identified by its default pointer (the next node in the ring network). In sub-step 124, the receiving node makes a comparison of its default nodal distance to the largest observed distance, as contained in the request. At the entry node 13, the largest observed distance in the request is not yet specified and thus treated as zero. Sub-step 126 is a determination as to whether the calculated default nodal distance is greater than the largest observed distance contained in the inbound message. If the determination is negative, then step 128 provides that the receiving node makes no changes to the largest observed distance value already present in the inbound message. If the determination is that the calculated distance is greater than the largest observed distance contained in the request, then in sub-step 130, the receiving node inserts its default nodal distance in the request as a replacement of the previous largest observed distance. In one embodiment, if the node changes the largest observed distance, it also adds to the request message its identity, such as its nodal value, to establish that it was the node first established this larger observed distance.

Following either sub-step 128 or sub-step 130, a sub-step 132 provides that each node makes a determination as to whether it is the end node. If the node is not the end node, in sub-step 134, the node forwards the communication to another node based on an algorithmic determination such as described with FIG. 3 or FIG. 5. If the node is the end node, in sub-step 136, the node generates a reply communication and returns the communication to the preceding node (the node that forwarded it the communication).

Once the end node of the location request message is found, a return communication is generated and returned in reverse on the nodal path formed from the entry node 13 to the end node. Steps 140 and 142 provides that each node in the return path traversal inspect the return communication to determine if it is the node identified as having the largest observed distance to its neighbor. The node may make this determination by inspecting the data contained in the message, which reflects information inserted by the node in the inbound communication that had the largest path distance to its neighbor. In one embodiment, this determination is done by comparing a nodes default nodal distance to the largest observed distance as provided in the response message. In one embodiment, the identity, such as the nodal value of the node that established the largest distance, is provided in the returned message and may be used to perform the identification of the node that established the largest value.

If a node determines it is not the node with the largest observed distance to its neighbor, then step 150 provides that it does nothing, and forwards the outbound communication to the next node in the return path. However, if a node receiving the return communication determines it is the node with the largest path distance to its neighbor, then step 160 provides that the node performs certain configuration operations to configure itself and the new node for the network 12. In sub-step 162, this node determines a location value between it and its neighbor (the node pointed to by its default pointer), such as the midpoint, and inserts this value in the return communication as the nodal location of the new node in step 164. In sub-step 166, the node adjusts its default pointer (i.e. its adjacent node pointer) so that it will link to the computer 20 at the determined nodal location.

In an intermediate sub-step 167, one embodiment provides that the node recalculates its estimate of the network size, based on the new distance between its nodal location and the nodal location of the new node. Networks size estimate may be based on the reciprocal of the distance to the default pointer (the new node). Based on this new estimate of overall network size, the range of allowable node classifications (for example, the maximum allowable level) for the given node may be recalculated, and a new node classification (i.e., node level) may optionally be established for the node. For example, if the level of the node is defined to be the result of reducing a large pseudo-random number modulo the maximum available level (as just recomputed), then the level of the node may change. If the nodes classification (level of a node) changes, then the corresponding criteria for some pointers from the node may change, and some pointers may be reset or discarded. For example, if the level of the node changed from level 2 to level 5, then the level pointer would no longer meet the criteria of being in a node of a given range (the ranges for such nodal values may not overlap). In some embodiments, existing pointers that don't meet criteria for the re-classified (re-leveled) node as the old type of pointer may be used as other pointers with criteria that are now being satisfied. The potential for such scenarios will be apparent when a wider range of pointers are described for each node later in the specification.

In sub-step 168, the node also inserts into the return message the nodal location of the previous adjacent node, which is to become the new node's adjacent pointer. In one embodiment, sub-step 166 is not performed until after computer 20 has received messages and configured its nodal value and default link as a result of steps 164 and 168.

In step 170, the return communication is communicated to the computer 20. In one implementation, the entry node 13 eventually receives the return communication and forwards it to the computer 20. Alternatively, the entrance of the computer 20 to the network 12 may be a result of more direct communication of information in substeps 164 and 168, for example by a direct message from the node that established the largest observed distance. Thus, the node that performs sub-step 170 may communicate directly with the computer 20 upon determining the computer's nodal location.

In step 180, the computer 20 receives the return communication and becomes part of the network 12. The enablement program 25 may accept the nodal location and the nodal location of the adjacent pointer from the return communication.

Figure 7:
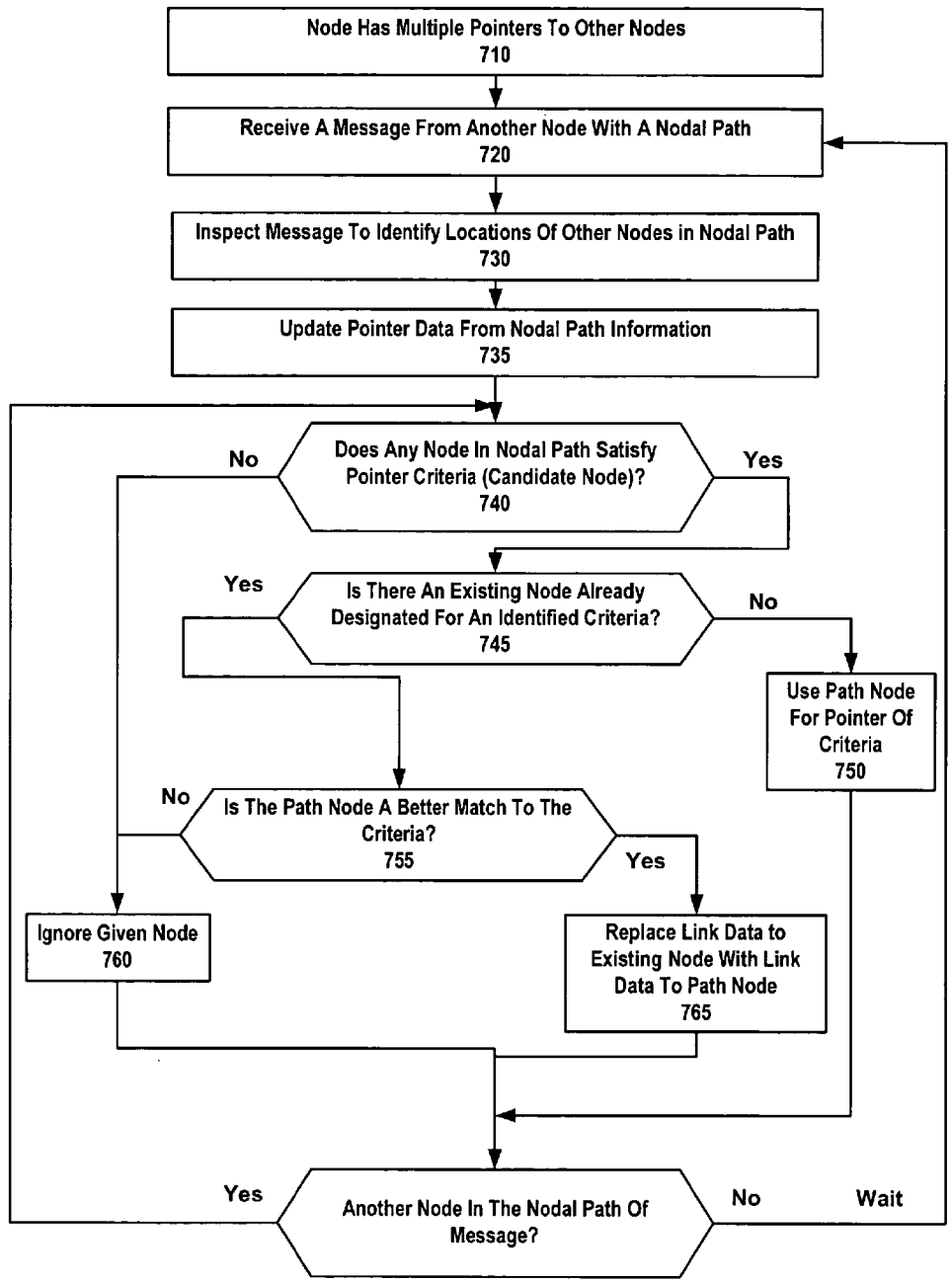
FIG. 7 illustrates such an embodiment in which a given node evaluates its pointers for better pointers using information contained in node-to-node communications, under an embodiment of the invention.

Once in the network, the enablement program 25 may start to build its pointers (as described with, for example, FIG. 2 and FIG. 7). For example, when computer 20 receives communications to become part of the network, that communication may include information encapsulated in the response to the path traversal 140, such as nodal locations and levels of other nodes, and that information may be used to initialize some pointer in the newly added node. As described further with an embodiment, the enablement program 25 may be configured to perform a lazy build of its additional pointers. As such, under one embodiment, the node may use passive inspection of traffic passing through it to determine its additional pointers. This is in contrast to actively seeking out pointers. Furthermore, the enablement program 25 continuously adapts to improve and adjust its pointers.

While FIG. 1B illustrates a technique where nodes 14 in the network 12 determine the node location, the node distribution technique may be performed using information determined from a source other than the network's node. For example, as an alternative, the nodal location of computer 10 on the network 12 is determined by the server 10 scanning a set or designated number of nodes in the sequence, and determining node location spacing between pairs of adjacent nodes in the sequence. The server 10 identifies the largest node separation between adjacent nodes in the scanned sequence, and provides the computer 10 with a nodal location that is in the middle of the nodal location of the two nodes in that pair.

New Node Processing

An overlay network, such as described with FIG. 1A, that has a ring or looped formation may use additional pointers to expedite traversal of the network. Absent additional pointers, for example, each request may require a default path traversal, which may require a node to pass a communication to its immediately adjacent node and so forth until the end node is reached. At the end node, the return communication is initiated. For an overlay network, such a traversal route using only default node pointers may be prohibitively costly or time consuming. Thus, individual nodes may each be linked with multiple nodes, and the pointer used by a given node at a given instance depends on a particular condition or criteria being met when a communication is received.

FIG. 2 illustrates a method by which a recently added node in a network procures additional pointers with other nodes, for purpose of facilitating path traversals to locate other nodal values when subsequent location or request messages are received, under an embodiment of the invention. As described above, the additional pointers enable a newly added node to forward communications in certain cases to a node other than the node of its default pointer (i.e. its adjacent node). In describing a method of FIG. 2, reference may be made to other elements of FIG. 1A, for purpose of illustrating a suitable component or element for performing a step, sub-step or other operation.

Steps 210-240 describe initial steps performed by a node, just prior to, or at the time the node enters the network 12. In step 210, a node seeking entry into the network 12 ("new node") is provided its node location within the network (see e.g. FIG. 1B) and its network level. As described above, one implementation provides that the level is a class assignment that is randomly selected from a number between 1 and L, where L is an integer just less than log (e.g. base 2) of the estimate of the total number of nodes on a network. Thus, for a million node network, for example, the level assigned to a particular node may be equal to a randomly determined number between 1 and 19. The level assignment may be made or seeded by, for example, administrative server 10, one of the nodes in the network 12, or even by the enablement program 25, upon seeing information contained in the return message that is sufficient to complete the join.

In step 220, link data is provided to the new node for its default pointer. For example, as described with an embodiment of the FIG. 1B, the new node may receive link data to its immediately adjacent node, which forms that node's default pointer.

Step 230 provides that the new node receives possible nodal location values for its additional pointers. For example, as will be described, each node may be linked with second node (in addition to its default pointer) that is separated by a nodal distance that is in a range determined by the node's level.

In step 240, the node upstream to the new node adjusts its link data so that the new node is its default pointer. Steps 210-240 may be performed in any order, or concurrently, in order to place a node in a network to be functional. As described with embodiments of FIG. 1B, for example, steps 210-240 may be performed through the use of the network 12, and specifically, through individual nodes cooperating with one another to handle and update a message or other communication relating to an entry request. The message returned to the new node thus specifies much of the information and configurations provided for in steps 210-240.

According to an embodiment, once the new node is placed on the network, so as to be operative, it exhibits lazy behavior in procuring additional pointers. As such, the node does not actively seek out other nodes for its pointers, or instigate communications solely for the purposes of acquiring additional pointers. Rather, step 250 provides that the new node waits for an information event before identifying a pointer other than its default pointer. An embodiment provides for information events in the form of communications or messages passed between nodes. In particular, the enablement program 25 or other programmatic component operating on the nodes may provide for node-to-node communications to maintain nodal path information. Nodal path information corresponds to information that identifies the nodal location of each node that handled a message, from the originating node to the destination node, and in the case of reply messages, from the destination node to the originating node. Nodal path information for a node includes all information needed to establish a pointer to the node, including an address (for sending directly any communications), its current node level, and a nodal location. Numerous types of node-to-node communications may be used as information events on a given node. Examples include (i) a message originating from another node, such as in the form of a location or search request or even an entry request for a particular nodal location, (collectively "location request message") for a node, or a resource handled by a particular node, (ii) a reply message to a location request message("reply location request message" or sometimes "reply message"), and being forwarded to the originating node, (iii) a reply location request message intended for the newly joined node. In the latter case, the reply message may correspond to, for example, the reply to the node's initial entry request, or a reply to a location request processed after the node joined the network.

In an example provided by FIG. 2, an assumption is made that the new node will use communications originating from other nodes to identify additional nodal pointers. In sub-step 252, the new node receives a location request message for a particular node. The location request message may carry nodal path information, which the new node inspects in sub-step 254. The location request message may, for example, identify nodes in the nodal path that are linked by default and additional pointers. Upon identifying nodal path information, the new node performs step 270 (described below), as the outgoing location request message constitutes an information event.

Concurrently, the new node forwards the message onward in the network 12. At an initial time, it may have only its default pointer, so it may be forced to forward the location request message in sub-step 256 to the node of its default pointer. Eventually, the node that is sought by the location request message is identified, and a reply message is generated from that node that makes its way back to the node that just joined the network. In sub-step 258, the new node receives a reply location request message, originating from the node located by the outgoing message. This reply message may constitute a new information event, and as such, step 270 is performed, where the nodal path information is inspected to identify locations of other nodes in the nodal path contained by that message. When performed for reply messages, the nodal path contained by that message may include downstream nodes, interconnected through a combination of default and/or additional pointers. Step 270 and its sub-steps are described in greater detail below.

In step 270, a process is performed using nodal path information of a given message handled by the node. The process identifies nodes in a nodal path of a given message. Sub-steps 272-280 are one implementation in which a nodal path may be used to identify pointers between the new node and other nodes in the network 12. As mentioned, the nodal path information may specify the nodal locations of individual nodes that comprise a particular nodal path (or portion thereof). In sub-step 272, the location of an individual node is identified. A determination is made in sub-step 274 as to whether the location of the identified node satisfies a criteria for adding an additional pointer to an identified node. In one embodiment, the criteria corresponds to the node having a nodal location that is within a particular range. In one embodiment, the criteria correspond to the node having a specific level, such as one greater than the level of the examining node, as well as a nodal location in a particular range. In one embodiment, the criteria corresponds to a node having a specific level, such as level 1. If the node does not satisfy the particular criteria, then step 276 provides that the node is ignored. If the node does satisfy the particular criteria, then in step 278, link data may be identified to form a pointer with the identified node. Step 278 assumes that the node is truly "new" in that no other pointer satisfying the criteria of step 274 already exists. If a node already has a pointer that satisfies the criteria, then under an embodiment such as described with FIG. 7, the identified pointer may replace the existing pointer. Subsequent to step 278, the node has at least one other pointer to a node other than its default pointer. As described with other embodiments, the additional pointer may enable the node to "jump" (go out of sequence) or "expedite transmissions" (skipping over extraneous nodes on the ring network) when sending out request messages in the future. In sub-step 280, a determination is made as to whether other nodes are identified by the nodal path information of a given message. If other nodes are identified, then step 270 is performed again, starting at sub-step 272.

Otherwise, in step 290, the new node waits for its next information event. The use of information carried by messages recording locations of other nodes is sometimes referred to as "gossip". Embodiments contemplate that a new node can use gossip, on outbound and/or inbound communications, to (i) establish initial pointers other than the default pointer with other nodes in the network, and (ii) as described further below, to continuously update pointers in order to improve pointers, particularly improving the quality with which a pointer satisfies the criteria for the node from which the pointer was made.

Node Level Pointer

As mentioned, one or more embodiments may classify the nodes of a network into levels. A level assignment to a given node provides a basis for computing one or more of that node's pointers. Under one implementation, one additional pointer (e.g. non-default pointer) that can be made for a given node is a link to a node with a location value that is separated from the given node's nodal locations by a range of distances that is defined by that node's level. Under one embodiment, the nodal values are in the range of 0 to 1, the range of possible integer level assignments is based on the $\log_2$ of the estimated size of the network, and the range of acceptable distances from a given node to its level pointer is bounded by the reciprocal of 2 raised to the power of the level of node (the optimum distance) up to double that distance. The following, for example, illustrates acceptable distances to nodes that may be established as link pointers from nodes at various levels in a network where nodal locations are all in the range of 0 to 1 (excluding 1):

| Level n | $1/2^n$ Optimum distance | Range of distances d to Linked Node |
|---|---|---|
| 1 | 0.5 | $0.5 \leq d < 1$ |
| 2 | 0.25 | $0.25 \leq d < .5$ |
| ... | | |
| 20 | 0.00000095367431640625 | $0.00000095367431640625 \leq d < ...$ |
| ... | | |

Under such an implementation, a node may be assigned a node level between 1 and L, where L is based on the $\log_2$ of the estimated size of the network. One pointer that can be defined using the level is to link a given node with another node that bests satisfies the level size (i.e. "½" for Level 1 etc.). With regard to terminology, the term "next level" means the next higher level with a correspondingly smaller range of distances, in the context provided above. For example, the next level to Level 1 is Level 2.

Figure 3:
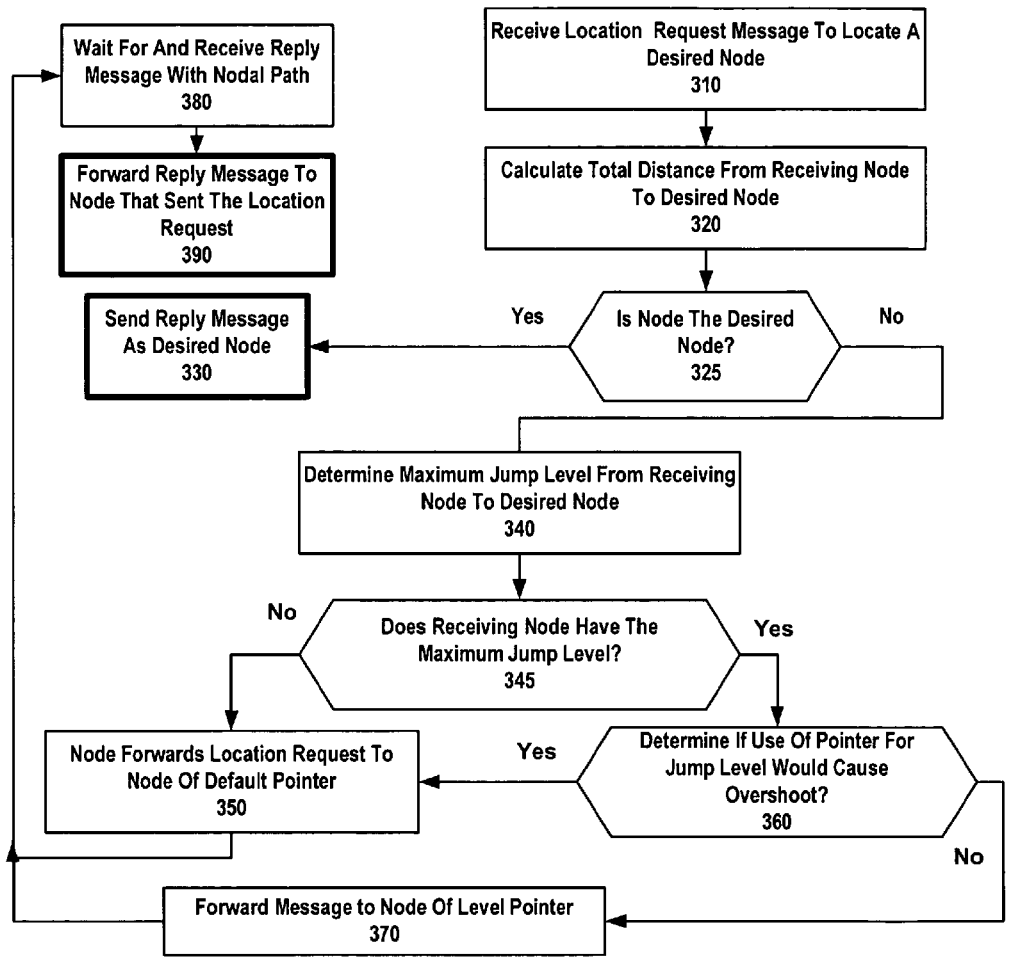
FIG. 3 illustrates a method for using, on a given node, an additional node pointer based on a level assignment, under an embodiment of the invention.

FIG. 3 illustrates a method for using, on a given node, an additional node pointer based on a level assignment, under an embodiment of the invention. A method such as described by FIG. 3 is illustrated in the context of the given node receiving a location request message, although a method such as described is applicable with other kinds of messages as well.

In step 310, the given node receives the location request message to locate a desired node. The location request message may be forwarded from another node, such as one that is linked through default with the given node, or alternatively, one that is linked through level assignment or other condition or criteria with the given node. The location request message may be generated locally, for example by an application running on the computer that hosts this node.

In step 320, the given node calculates a total distance to the desired node. The calculation may be a difference between a nodal location A specified in the location request message and the node's own nodal location B, adjusted as follows. As noted earlier, if a difference B-A is negative, the distance is defined to be adjusted to a positive value by adding a constant C. The constant C is defined to be the difference between the largest and smallest possible nodal values. For example, if nodal values are in the range of 0 to 1, then the difference between nodal values A and B is either B-A, or, if B-A is negative, then B-A+1.

In step 325, a determination is made as to whether the given node is the desired node specified by the location request message. The given node may be the desired node if the given node is, at the particular time, assigned nodal location value that is closer to the requested value than the default node (next node on the ring).

If the determination of step 325 is that the given node is also the desired node, then step 330 provides that a reply location request message is generated and forwarded back to the originating node that made the initial node location request. An embodiment provides that when the reply message is generated, the reply message returns to the originating node through the same nodal path that was followed to reach the given node, albeit in reverse. The reply location request message may include nodal path information, defining the nodal path of the location request message from the originating node to the given node. In this way, the reply message provides additional "gossip" by which other nodes in the nodal path can form and improve their own nodal pointers. (See step 270 of FIG. 2, or FIG. 7).

If the determination of step 325 is that the given node is not the desired node, then step 340 provides that the maximum jump level from the given node to the desired node is calculated. The "maximum jump level" for a requested nodal value that is distance $d_0$ away from the current nodal value is defined to be a nodal level for which the corresponding level based node pointer would include $d_0$ in the range of acceptable distances to a second node. For example, if nodal values are in the range of 0 to 1, and a requested nodal value is $0.27=d_0$ away from the current nodal value, then the "maximum jump level" is 2, as $0.25<d_0<0.5$. Step 345 provides one criteria for determining whether the given node should forward the location request message to the node of its level pointer. The criteria specified in step 345 is whether the level assignment of the given node is equal to the maximum jump level. If this determination is negative, an embodiment provides that in step 350, the location request message is forwarded to a node of another pointer, which for simplicity, is assumed to be the node of the default pointer.

Under an embodiment, a rule may be employed where no pointer is used to forward messages if use of the pointer would cause the message to be sent to a node that overshoots the desired location. A range may be applied when implementing this rule. For example, the desired location may specify a range, and no overshoot is deemed if the minimum value of the range is less than the location of the particular node of the pointer. Given this rule, an embodiment provides that if the determination of step 345 is positive, then in step 360, the node determines whether forwarding the location request message to the node of its level pointer would overshoot the location specified in the location request message. If the determination is overshoot would result, then step 350 is performed. Otherwise, in step 370, the given node forwards the message to the node of the level pointer.

Following either step 350 or step 370, step 380 provides that the given node waits for and receives a reply location message from the desired node, when located. As mentioned elsewhere, the nodal path information provided in the reply message may be used to generate and/or update node pointers. In step 390, the reply location request message is forwarded to the source of the original location request message to the given node, for example to the upstream node that supplied the request, or to the local application that supplied the request.

FIG. 4 is a simplified illustration of a ring network in which a given node is provided both a default and an assignment level pointer to other nodes, under an embodiment of the invention. A ring network 400 may include a plurality of nodes 412 connected in a sequence to form a ring or looped network. A first given node 414 has an integer level assignment 415 in the range from 1 to floor(L) where under one embodiment, L is the $\log_2$ of the given node's estimate of the overall estimated network size. In the example provided, the first given node 414 has a Level 1 assignment, meaning it can be linked with another node 416 that is separated by a nodal location difference in a range of 0.5 or higher (assuming that nodal locations range from 0 or greater to less than 1). This is represented by pointer 420. The first given node 414 may also have its default pointer node 422, which in the implementation shown, is with its immediately adjacent node in terms of node location or sequence.

To further illustrate use of level pointer, a second given node 432 may have a Level 2 assignment. As such, the second node's level pointer is directed at node 436 (separated by a nodal location difference in a range of at least 0.25, and not more than 0.5) while its default pointer 442 may be with the immediately adjacent node.

Figure 5:
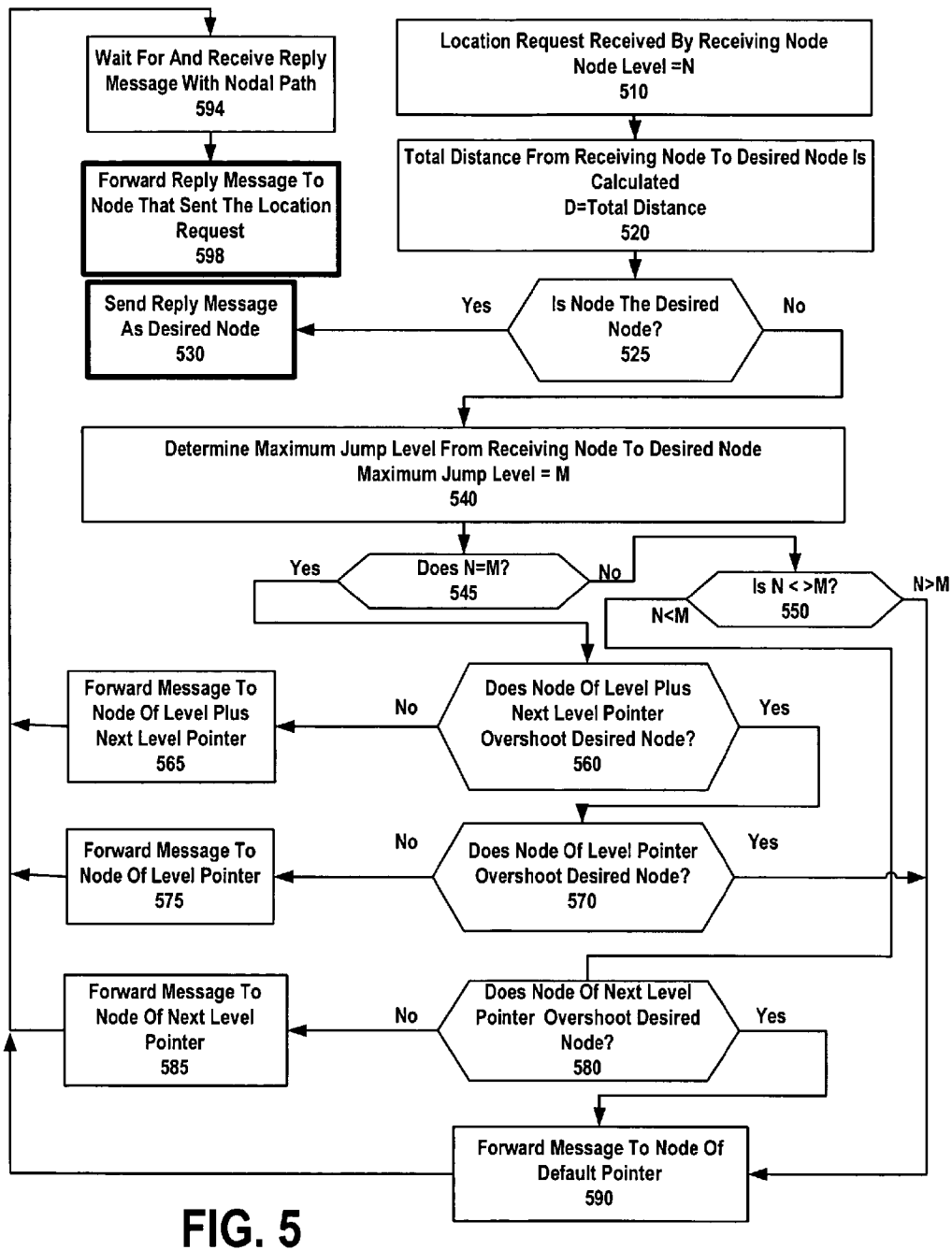
FIG. 5 illustrates a method that utilizes multiple pointers for individual nodes, under an embodiment of the invention.

FIG. 3 and FIG. 4 illustrate just one type of pointer that is in addition to a default pointer. Another embodiment provides that a node has other pointers, in addition to level pointer and default pointer. FIG. 5 illustrates a method that utilizes multiple pointers for individual nodes, under an embodiment of the invention. As will be described, the additional pointers described with FIG. 5 include (i) default pointer, (ii) level pointer, (iii) next level pointer, and/or (iv) level plus next level pointer. Default pointers and level pointers have been described with, for example, FIG. 2 and FIG. 3. A next level pointer is described with step 570, below. Similarly, a level plus next level pointer is described with step 560, below.

Step 510 provides that a given node on a ring network, such as described above, receives a location request message. The given node has a node level assignment of N. In step 520, the given node calculates the total nodal distance D to the requested nodal value. This nodal distance value D is the clockwise distance around the ring from the given node's nodal location to the requested nodal location. A determination is made in step 525 as to whether the given node is the desired node. For example, if the value of D is less than the default nodal distance (the distance to the default node, which is adjacent on the ring), the determination is that the given node is the desired node of the location request message. Following step 525, if a determination is that the given node is the desired node, then step 530 provides that the reply message is sent from the given node. As mentioned, the reply message may be a reply location request message, carrying information identifying the nodal path of the node from which the location request message originated to the given node. If the determination of step 525 is that the given node is not the desired node, then step 540 provides that a maximum jump level is determined from the given node to the requested nodal location. A definition of maximum jump level, along with an example of how it may be calculated was provided in conjunction with step 340 of FIG. 3. The maximum jump level is labeled M.

In step 545 a determination is made as to whether the node level of the given node (N) equals the maximum jump level (M). For example, in the case where level assignments are implemented, the maximum jump level may correspond to a Level 1 pointer. Then in step 545, the determination is whether the given node has a Level 1 assignment.

If the determination in step 545 is that the node level does not equal the maximum jump level, then two possibilities exist. A determination is made in step 550 as to whether the node level N is less than the maximum jump level M. For example, if the maximum jump level M is of Level 2, and node level is Level 1, then N<M. If the determination is positive, then the method proceeds to step 590, in which the message is forwarded using a default pointer. If, however, the determination in step 550 is that the node level N is greater than the maximum jump level M, an embodiment provides for a possibility for a node of a non-default pointer to be used. Accordingly, the method proceeds to step 580.

If the determination in step 545 is that the node level equals the maximum jump level, then step 560 makes a determination as to whether forwarding a message to a node of a level plus next level pointer is possible. In one implementation, the level plus next level pointer corresponds to a node that is (i) separated from the given node by a distance that is in the acceptable range for the given node's level pointer (a plausible level linked node), and additionally (ii) that node has a node level that is one greater than the given node. For example, if the given node is a Level 1 node, then the level plus next level pointer corresponds to the closest observed Level 2 node that is separated from the given node by a distance between 0.5 an 1.0 (assuming nodal locations rang from 0 to 1). In one embodiment, forwarding the message to the level plus next level pointer is possible if the jump to that node does not overshoot the desired node. If no overshoot is determined to result, then step 565 provides that the message is forwarded from the given node to the node of the level plus next level pointer.

If overshoot is determined to result from step 560, then in step 570, a determination is made as to whether forwarding the message to the node of a level pointer would cause overshoot. For example, both the level pointer and the maximum jump level may correspond to Level 1, but the node of the level pointer may still be further from the given node than the desired nodal location. If overshoot is determined to result, then step 575 provides that the message is forwarded from the given node to the node of the level pointer.

Otherwise, if overshoot is determined to result from step 570, then in step 580, an embodiment provides for the use of a next level pointer. A next level pointer from a given node is a pointer to the closest observed node that has a level that is exactly one greater than the given node's level. For example, if the level of the given node is Level 1, the next level pointer is to a node having Level 2 that is the closest (clockwise distance) node to the given node to the given node that has been observed (by reviewing gossip) by the given node Accordingly, in step 580, a determination is made as to whether the linked node for the next level pointer would overshoot the desired node. If the determination is negative, then in step 585, the location request message is forwarded to the node of the next level pointer for the given node. Otherwise, in step 590, the message is forwarded to the node of the default pointer for the given node.

As described with an embodiment of FIG. 5, a location request message may be sent to one of four possible nodes, depending on criteria that includes the desired node's location, as well as the node level assignment for the given node. Once the location request message is forwarded to one of the nodes, the given node processes the reply. In step 594, the given node waits for and receives a reply location request message from the desired node, which is an upstream node. As mentioned elsewhere, the reply message may contained nodal path information that the given node can use to improve its pointers. Following step 594, step 598 provides that the reply location request message is forwarded to the source of the original request, for example to a local process on the node, or to the node that sent the given node the location request message.

According to an embodiment, certain pointers may be instantiated for only some nodes, and not all nodes. For example, in a small network having only level 1, 2 and 3 nodes, while all nodes may have a default pointer, only high level nodes (e.g. Level 1 or Level 2) may have the additional next level (plus level) pointers such as described by a method of FIG. 5. In such a small network, that didn't have any Level 4 nodes, it would be impossible to find a next level pointer or a level plus next level pointer from a Level 3 node. For example, only nodes of a particular class of large level-assignments (e.g. 1 or 2) may be configured using node pointers such as described with FIG. 5, at least until the network grows larger.

According to an embodiment, in each case of a viability test for overshoot (steps 560, 570, and 580), if the pointer that would have been tested for has not been instantiated, then the test is skipped, and an embodiment would proceed to steps that would not require use of the pointer (steps 570, 580, and 590 respectively).

FIG. 6A illustrates a node network with the pointers described in a method of FIG. 5, according to one or more embodiments. In FIG. 6A, a network 600 comprises nodes 610-621, including a given node 610. The node 610 is assumed to have a high level assignment (e.g. Level 1) and four node pointers: (i) default node pointer 622, (ii) level pointer 624, (iii) a level plus next level pointer 626, and (iv) a next level pointer 628. In order to forward an incoming message (e.g. location request message), the node 612 may use one of the four possible pointers.

Under one embodiment, one rule against forwarding the message to a particular node of a pointer is that the forwarding cannot cause the message to overshoot the desired node. In the simplified illustration of 12 nodes, for example, the default node pointer is used when the desired node is node 611. The next level pointer 628 is used when the desired node is node 612, node 613, node 614 or node 615. The level pointer 624 is used when the desired node is node 616, or node 617. The level plus next level pointer 626 may be used when the desired node is node 618-node 621.

FIG. 6B illustrates a variation in which nodes may include a link to a high level node (such as a Level 1 node), under an embodiment. In the example provided, the node 620 is assumed to be low level (e.g. level 3 in a 12 node network) and has a Level 1 pointer 642 to the nearest (observed) Level 1 node (node 610). In one embodiment, a low level node may have just the Level 1 pointer 642 and the default pointer 644. Alternatively, as illustrated by FIG. 6B, the node may have some of the pointers illustrated with FIG. 6A, as well as optionally a Level 1 Pointer. In the example illustrated, the links include a next level pointer to a node (having Level 4), a level pointer to a node (with a distance within the appropriate range), and a level plus next level pointer to a node (within an appropriate range of distances and also having the requisite Level 4). Note that FIG. 6B is not "drawn to scale" relative to nodal locations, as the three level constrained links from Level 3 node 620 would typically traverse no more than about 25% around the ring, based on nodal locations and resulting distances.

In an embodiment, a Level 1 Pointer may be incorporated into a request forwarding process such as was described in conjunction with FIG. 5 to accelerate progress towards the requested nodal location. For example, when the test in step 550 determines that the node's level is greater that the maximum jump level, then rather than proceeding to step 590 as per FIG. 5, the Level 1 Pointer (if it is instantiated) may be tested to see if it is closer to the requested nodal location (without overshooting) than the current node's. If the Level 1 Pointer was viable (didn't over shoot) then the request may be forwarded to the node of the Level 1 Pointer, and the current node could then wait in step 594 for a response. If the Level 1 Pointer was not viable (overshoots, or not instantiated), then processing may continue in step 590 as described earlier.

Adaptability of a Node

As mentioned, one or more embodiments provide that nodes have the ability to use information carried in node-to-node communications to update and improved their individual pointers. For example, in a network where there are thousands or even a million nodes, the ability to find the best pointer increases overall network efficiency. According to an embodiment, a given node continuously monitors and updates nodal traffic to identify new nodes that better satisfy the criteria for a pointer that may already be in existence. FIG. 7 illustrates such an embodiment in which a given node evaluates its pointers for better pointers using information contained in node-to-node communications, under an embodiment of the invention.

In step 710, a given node may have link data to multiple other nodes on the network. The link data may form pointers between the given node and the one or more other nodes. For example, as illustrated by FIG. 6A, a given node may have link data to a node of a level pointer, a node of a next level pointer, and/or a node of a level plus next level pointer. Further illustrated by FIG. 6B, a given node may have link data to a level 1 node (e.g. Level 1 node pointer). In an embodiment, the node level pointers are each made to nodes that are located in a desired nodal location range.

Step 720 provides that a message is received from another node containing nodal path information. Such messages may be incoming messages (e.g. location request messages) or outgoing messages (e.g. reply location request messages), as well as other forms of node-to-node communications.

In step 730, the given node inspects the communication from another node to identify the nodal path information. The nodal path information includes levels and locations of other nodes in a nodal path recorded by the nodal path information.

In step 735 all pointers from the given node are identified in the nodal path, at least to the extent such pointers are present in the nodal path. If the nodal path provides information that differs from information stored in the pointers, then the pointers may be discarded if they no longer satisfy their respective criteria. For example, if a criteria for referring to a node as a pointer includes a requirement that the node be at a specific level, but the nodal path information asserts that the node now has a level that does not satisfy the criteria, then the pointer may be discarded. In some embodiments, a node may have a record of an alternate plausible pointer that was identified in previous gossip, but which was not as optimal as the current (about to be discarded) pointer, and that alternate may be used to replace the current (about to be discarded) pointer.

At step 740 a determination is made as to whether any node in the nodal path identified from the communication satisfies a particular criteria for a nodal pointer. For example, with respect to an embodiment such as shown by FIG. 6A, the criteria's for nodal pointers include: whether the location of the identified node satisfies requirements to be a level pointer candidate, whether the location and level of the identified node satisfies requirements to be a level plus next level pointer candidate, or whether the level of the identified node satisfies requirements to be a next level pointer candidate. With regard to an embodiment of FIG. 6B, the criteria for a Level 1 Pointer is that the level of the identified node is 1. If level 1 node is found, the conclusion may be drawn that the node is a candidate for a Level 1 pointer. Nodes that satisfy criteria of step 740 are labeled candidate nodes.

In step 745, a determination is made as to whether there already is an existing node for the criteria satisfied by each identified candidate node. If the determination is negative, then step 750 provides that the candidate node is used to make the pointer with the given node, for the particular criteria satisfied by that candidate node.

Otherwise, it the determination is that there already is an existing node for the criteria satisfied by each candidate node, then step 755 makes a determination as to whether the candidate node better satisfies the criteria than the existing node. In one embodiment, a candidate node is a better match if it is closer (clockwise) to the given node. For example, a node is a better match for a level pointer if it is separated from the given node by a nodal distance value that is smaller. As another example, a Level 1 node is a better match for a Level 1 pointer if it is closer to the given node than the previous Level 1 node. Numerous variations and combinations to what constitutes criteria and how criteria can be satisfied are contemplated herein.

If the determination in step 755 is that the candidate node is not a better match, then the candidate node is ignored in step 760. However, if the candidate node is a better match, then step 765 provides that the link data to the existing node for that pointer criteria is replaced with link data to the candidate node. In this way, the candidate node becomes the new pointer of the given node for the particular pointer criteria.

Following step 750, step 755 or step 760, a determination is made as to whether another node can be identified from the nodal path information of the communication. If another node can be identified, then the method repeats at step 740. Otherwise, one embodiment provides that the given node waits for another communication, so as to lazily receive and update its node pointers.

While an embodiment such as described with FIG. 7 applies to a node that has pointers established, then updates and improves the pointers, other implementations may use the method as described to assist a node in developing a new pointer that is not a replacement. For example, a method such as described may apply to a new node that has only its default pointer. Still further, a method such as described may be applied when a node has no pointer because the node of its pointer departed (see below). In such instances, the node may inspect nodal path information for pointers that serve as a replacement pointer to a node that is departed.

Nodal Departure

In an overlay network, nodal departure is not uncommon. Nodal departure may be either orchestrated or un-orchestrated. In order to accommodate a nodal departure, each node may have an upstream pointer. An upstream pointer is a link between adjacent nodes on the ring network going in exactly the opposite direction of the default pointer (i.e., going counterclockwise). In one embodiment, the upstream pointer is used only for when node departure is being accommodated. When orchestrated, the departing node has an opportunity to announce its departure, and to cause its departure from the network to be accounted for by new pointers. In particular, a node may announce its departure in response to an event, such as a user-logging off.

In order to accommodate orchestrated departure, one or more embodiments contemplate use of an upstream pointer. In particular, a ring or looped network such as illustrated by other embodiments of this application may be configured to have a particular downstream orientation when location request messages and other messages are passed from node to node. The downstream orientation means that the node-to-node messages must progress in a particular direction with respect to the requested node location (e.g. generally increasing, never overshooting a requested nodal location, and always diminishing the clockwise distance to the requested nodal location). Orchestrated nodal departure provides an exception to a general rule implemented by some embodiments, in which nodal pointers are downstream links. In particular, one embodiment provides that each node may have an upstream nodal pointer for use in enabling the network to accommodate its departure.

According to an embodiment, any given node that joins the network may be provided an upstream pointer to the node that uses the given node for its default pointer. In an embodiment, this corresponds to the immediately adjacent upstream node. The upstream pointer may be used in the event that the given node has an orchestrated departure, such as caused by to a user electing to log-off, or some other event in which the computer being used as a node is to stop its node processes (e.g. close the enablement program of FIG. 1). When the departure event occurs, the given node responds by (i) using its upstream pointer to send its departure announcement, including identification of the default pointer to the given node (e.g. location of the node of the default pointer), and (ii) use its default pointer to send the node of the default pointer ("departor") identification of the node of the upstream pointer.

In response to these communications being send from the departor, the upstream node changes its default pointer, so as to pair with the node of the default pointer to the departor. The node of the default pointer for the departor receives the communication from the departor and changes its upstream pointer to be the node of the departor's upstream pointer. The departor is then mostly accounted for by the node of its upstream pointer and default pointer linking to each other, and the departor may cease to respond to messages from other nodes. For example, other nodes may attempt to contact the departor because the departor may be a destination of a pointer from some other node(s), such as a link level pointer, a level plus link level pointer, a level 1 pointer, or a next level pointer. In some embodiments, when additional nodes fail in their attempts to contact a departor the may delete (or reset to empty) their pointer to the departor that ceases to function. In some embodiments, a node may maintain a list of alternate, or less optimal, plausible pointers, and may use such an alternate pointer values when a pointer to a departor would otherwise be reset.

Not all nodal departures can be orchestrated. For example, a computer that acts as a node may crash or suffer a power outage. In such cases, the departor has no opportunity to orchestrate its departure. The nodes on the network must discover the departure and accommodate it without the departor's assistance. Under such cases, an embodiment provides for discover of a departing node by either a node of its default pointer or by a node of its upstream pointer. The node of a departor's upstream pointer also has the departor as its default pointer, so the discovery may happen when the upstream node attempts to forward the departor a message, such as a request message. If the upstream node attempts to send the departor a message (via its default pointer) and sees no node at the location of the departor (for example, no acknowledgement of a transmission), it initiates a process by which (i) it receives a new default pointer, and (ii) it passes communications to other one or more other nodes that use the departor for other pointers.

Under one embodiment, each node in the network has an upstream pointer to its adjacent node (i.e. the node with the default pointer). When one node finds the downstream node of its default pointer is departed, it initiates a recovery search for a new default node. We will refer to the node that initiates the recovery search as the broken node. The recovery search may involve passing a recovery search message upstream, using the upstream pointer to each node, attempting to reach the departor (or the nearest neighbor of the departor). Each node that receives the recovery search message may forward the search upstream, until a node is encountered that cannot pass the message upstream, because its adjacent upstream node is the departor. A recovery reply message may then originate from the node that makes this discovery, and it may provide the broken node with a new default node. We refer to the node that initiates a recovery reply message as the recovery node. A recovery reply message may be used to facilitate linking a broken node to the recovery node bypassing the departor. For example, the recovery node may directly contact the broken node, the broken node may use the recovery node as its default pointer, and the recovery node may use the broken node as its replacement upstream pointer. In some embodiments, when a new default pointer is established during a recovery, additional adjustments to a node must be made in the same manner as when a new node is added to a network. These changes may include creating a new estimate of the network size (based on the distance to the new default node), establishing a new category (level) for the node, and deleting, shuffling or resetting pointers to match criteria appropriate to the new category and pointer types. Details of these changes were discussed in conjunction with join operations, when an existing node changed its default pointer to point at a new node. In some embodiments the recovery reply message may be passed backwards along the path that transported the recovery search message. Furthermore, the recovery messages can be inspected for path node information, such as in a manner described with an embodiment of FIG. 6.

Under another embodiment, recovery search messages may be routed towards a recovery node more efficiently than universally using the upstream pointers. Note that a recovery search message is initiated by the broken node which is the closest (clockwise) to the departor, and is seeking to find the (recovery) node that the departor was closest to (clockwise). As a result, a recovery search message using the previous method would typically traverse all nodes in the network. As an alternative, each node that receives a recovery search message may consider using one of its pointers other than the upstream pointer to further process the recovery search message if some criteria is met. One example of the criteria for viability of accelerating transmission of a recovery search message via a pointer node is to test to see if the distance from the departor to the pointer node is less than the distance from the current node to the departor (both distances are measured clockwise), and in addition to test that the departor node is also closer to the pointer than to the current node (to assure that recovery search messages always make counterclockwise progress). In one embodiment, when such a viable pointer is identified, the recovery search message may be sent directly to that pointer node. If several pointer nodes in a given node are viable as just described, then the pointer node that the departor node is closest to (clockwise) may be selected. Such acceleration (short circuiting) of a recovery message transmission in a large network may not only reduce the duration of time until a complete recovery, but may also reduce the probability of a second departure interfering with the recovery process for a first departure. In one embodiment, a recovery search message may contain a record of the pointer (P) in previously traversed nodes for which the departor was closest P. When the distance from the current node to the departor exceeds the distance from the departor to P, then the search request message may backtrack to the node with pointer P, and a recovery search message may be sent across pointer P and proceed (via upstream pointers) to the recovery node. Backtracking may be accomplished using a suitable backtracking recovery search message targeted at the node that established P in the recovery search message.

In some scenarios, a second unorchestrated departure may occur prior to the complete recovery from a first departure. We define complete recovery to mean that the first broken node has properly linked to a recovery node, and vice versa. It is significant to avoid the formation of two disjoint rings during the recovery process. In such a scenario, a recovery search message induced by a first departor and instigated by a first broken node may reach the neighbor of a second departor. In one embodiment, when a recovery message is received by a broken node, or considered for sending by a recovery node, a recovery criteria may be applied to decide if it is useful to form a link (as described earlier) between the broken node and the recovery node. For example, a recovery criteria may require that the distance (clockwise) between the broken node and the recovery node is sufficiently small, such as less than half of the largest possible distance between two nodes. For example, in a network where nodal locations varied in a range from 0 to 1, then the largest possible distance between any two nodal values would be arbitrarily close to 1, and half of that would be 0.5. In some embodiments, if the recovery criteria is met, then the recovery message is sent and processed (linking the nodes) as described above. In some embodiments, when the criteria is not met, a portion of the ring between the broken node and the detected recovery node may be disbanded (i.e., nodes may be directed to exit the network, and gracefully re-enter as new nodes). In some embodiments, a potential recovery node detecting a recovery criteria failure may send a disband message to the broken node. For example, a disband message may be transmitted using only the default pointers on the nodes that are forwarding it, Nodes receiving or transmitting a disband message may, after forwarding the message via their default pointer, reset all their state, and attempt to join the network as a new node. In some embodiments, a potential recovery node detecting a recovery criteria failure may wait for a period of time, such as 10 seconds, or for other events, before committing to send or aborting transmission of a disband message. In some embodiments, a potential recovery node may directly notify the broken node that it is waiting and may soon send a disband message. In some embodiments, if either the broken node or the potential recovery node are correctly linked prior to the expiration of the disband waiting period, then the disband message will not be sent. For example, if the broken node so notified is successfully linked to a second recovery node, then it may notify the waiting first recovery node that it should not disband. Similarly, if the recovery node in such a scenario is correctly relinked (due to some other recovery message processing), then it would cease to be a potential recovery node, and would forward the original recovery search message for further processing by its adjacent upstream node.

If a node's unexpected departure is discovered by the node of its default pointer (e.g. its adjacent downstream node), the process of identifying a replacement node may be made simpler. The downstream node may discover its upstream node has departed by, for example, inspecting the path information of a message passing through that node. The node may then send a message specifying the location of the departed node (corresponding to the location of its upstream pointer). The message is sent downstream, so that subsequent nodes can use different pointers to forward the message efficiently. Eventually, the node immediately adjacent and upstream to the departed node receives the communication, and from the communication, discovers the node of its default pointer has departed. The adjacent upstream node then configures its default pointer to coincide with the node from which the message originated, using nodal path information contained in the message. The adjacent upstream node may then send the reply message, communicating its nodal location to the node that originally discovered the departing node. Along the way, each node that receives this message, or the reply message, may inspect the nodal path information contained in the respective messages to update and improve its respective nodal pointers.

With regard to either of the cases presented above (discovery by upstream node or downstream node), the node may discover the departure of the departing node from nodal path information contained in a message passing through the node. Similarly, the nodal path information may sometimes be used to update the departed pointer.

Each node that departs may also be an end node to another node's additional pointers. For example, one departing node may serve as the default pointer for a first node, the upstream pointer for a second node, and the level assignment for a third node. Once that node departs, the first node of the default pointer and the second node of the upstream pointer may handle the departure in a manner described above. However the discovery by the third node of the level pointer may not occur until that node attempts to send the departed node a message, and the transmission fails. In such a case, the node may simply remove the departed node from the particular pointer, and use nodal path information contained in messages that pass through the node to identify a new node for the pointer. As described with FIG. 6, for example, any node identified for the new pointer may be replaced by a node that better satisfies the criteria of the pointer over time.

Alternative Embodiments

While numerous embodiments describe steps that comprise a method, it should be apparent that the sequence in which steps are performed are not necessarily of consequence. Furthermore, steps, sub-routines and portions of methods described by one or more embodiments may be shared or combined with steps or routines of other methods or portions thereof. For example, steps 270-280 may be equally illustrative of operations performed by a node seeking entry into the network 12, as described with, for example, FIG. 1B. Numerous other implementations are possible.

In some embodiments, a node may sign communications or portions of communications that is transmitted to another node. For example, data may be signed using techniques provided by public key cryptography. In that example, a node may maintain and use a cryptographic private key, specific to the given node, such as a key connected to a cryptographic certificate. As a second example, data may be signed by providing a keyed hash for the data, where the key is known only to the signer and to a signature certifying authority. In such a scenario, the identity of the signer may be provided in conjunction with any signature.

In some embodiments, a signature may be transmitted in conjunction the data that is signed. In some embodiments, a signature may be transmitted to the party that received the data at a point in time after the original transmission of the data. For example, such delayed transmission of a signature may allow for the data to be sent prior to completing the calculations necessary to compute the signature. In some embodiments, signatures and/or data may be transmitted to a central service, for example after transmission of the unsigned data to a peer node.

In some embodiments, nodal path data may be a signed portion of a communication. For example, when a given node appends or embeds node information into a nodal path data associated with a message, such as the node's nodal value, or the node's current class (such as its level), the given node may sign such data.

In some embodiments, inconsistent data transmissions from a node may be justification for a node to be expelled from a network. For example, if a given node claims to have a given nodal value (as placed into nodal path information), and claims to have a large given distance to its default pointer node (its adjacent neighbor on the ring) as placed into a message searching for a placement of a new node, but a second node has a nodal location that is closer to the given node than the implied location of the default pointer node, then evidence of malfunction or malevolent activity by the given node may be deduced. In some embodiments, signed data provided by a node may be used to prove that inconsistent data transmission has been provided by that node.

In some embodiments, a third party such as a network administration service may inspect evidence of inconsistent transmissions. For example, a network administration service may contact additional nodes, and request previously recorded messages, such as messages transmitted by an accused or randomly selected node. In that example, random selection and verification may be used to detect inconsistencies when they are statistically significant. In some embodiments a node in a network may independently review evidence, such as signed communications, and be convinced of the malfunction or malevolence of a node.

In some embodiments, expulsion of a node (the expellee) may include refusing to accept communications from the expellee, and avoiding transmission of communication to the expellee. For example, expulsion of a node may include relinking a node that previously had a default pointer to the expellee so that it has its default pointer reset to the node that the expellee previously used as its default pointer. Such a relinking may be performed using methods previously illustrated in conjunction with node departure, with the understanding the expellee may be willing to respond, but the process may proceed without attempting to further contact the expellee. As a second example, expulsion of a node (expellee) may include revocation of the cryptographic signing certificate that is being used by the expellee. In some embodiments, revocation may proceed in an aggressive fashion, where the revocation notice is flooded throughout the network. In some embodiments, revocation may be performed as needed, for example by having nodes contact a revocation service when validating signatures. In some embodiments, distribution of revocation notification may be performed as needed (and detected), for example by having one node accumulate evidence sufficient to expel the expellee (a.k.a., the expulsion proof), and recursively passing along the expulsion proof to any node that attempts to forward (directly, or indirectly) data signed by the expellee. In that example, additional nodes that are presented with an expulsion proof may use it (pass it along) exactly as the original node that assembled the expulsion proof.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for operating a nodal network, the method comprising:
   storing, for each of a plurality of nodes that form a part of the nodal network, a corresponding nodal location and a corresponding node level selected from a plurality of node levels, the nodal location corresponding to a value between a lower limit value and an upper limit value, wherein each node level corresponds to a different range of nodal distances between nodes of the nodal network;
   storing, for a given node, (i) a first pointer to a first node having a nodal location that is next in sequence to the given node, and (ii) a second pointer to a second node having a nodal location that is at a distance from the given nodal location of the given node, the distance being within a range of nodal distances of the given node level of the given node;
   monitoring activity that passes through the given node for information corresponding to a nodal path used to handle different communication requests involving other nodes in the nodal network; and
   from monitoring the activity, updating, for the given node, the second pointer to point to another node.

2. The method of claim 1, wherein each node that forms the part of the nodal network is sequenced based on the nodal location of each node.

3. The method of claim 1, wherein monitoring the activity includes identifying, from the nodal path, nodal locations of each node that forms the part of the nodal network that handled information corresponding to the nodal path.

4. The method of claim 1, wherein the value of the nodal location that is between the lower limit value and the upper limit value, for each of a plurality of nodes that form a part of the nodal network, is a hash value.

5. The method of claim 1, wherein updating the second pointer to point to another node includes updating the second pointer to point to a node having a nodal location that is at a smaller distance, than the distance of the second node, from the given nodal location of the given node.

6. The method of claim 1, wherein monitoring the activity includes determining information of some but not all nodes in the plurality of nodes that form the part of the nodal network.

7. The method of claim 1, wherein one or more nodes of the plurality of nodes that form the part of the nodal network include three or more pointers.

8. A non-transitory computer-readable medium storing instructions that, when executed by one or more processors, cause the one or more processors operate a nodal network, wherein the instructions cause the one or more processors to:
store, for each of a plurality of nodes that form a part of the nodal network, a corresponding nodal location and a corresponding node level selected from a plurality of node levels, the nodal location corresponding to a value between a lower limit value and an upper limit value, wherein each node level corresponds to a different range of nodal distances between nodes of the nodal network;
store, for a given node, (i) a first pointer to a first node having a nodal location that is next in sequence to the given node, and (ii) a second pointer to a second node having a nodal location that is at a distance from the given nodal location of the given node, the distance being within a range of nodal distances of the given node level of the given node;
monitor activity that passes through the given node for information corresponding to a nodal path used to handle different communication requests involving other nodes in the nodal network; and
from monitoring the activity, update, for the given node, the second pointer to point to another node.

9. The non-transitory computer-readable medium of claim 8, wherein each node that forms the part of the nodal network is sequenced based on the nodal location of each node.

10. The non-transitory computer-readable medium of claim 8, wherein the instructions cause the one or more processors to monitor the activity by identifying, from the nodal path, nodal locations of each node that forms the part of the nodal network that handled information corresponding to the nodal path.

11. The non-transitory computer-readable medium of claim 8, wherein the value of the nodal location that is between the lower limit value and the upper limit value, for each of a plurality of nodes that form a part of the nodal network, is a hash value.

12. The non-transitory computer-readable medium of claim 8, wherein the instructions cause the one or more processors to update the second pointer to point to another node by updating the second pointer to point to a node having a nodal location that is at a smaller distance, than the distance of the second node, from the given nodal location of the given node.

13. The non-transitory computer-readable medium of claim 8, wherein the instructions cause the one or more processors to monitor the activity by determining information of some but not all nodes in the plurality of nodes that form the part of the nodal network.

14. A computing device comprising:
a network interface;
memory resources storing instructions; and
one or more processors coupled to the network interface and the memory resources, the one or more processors to execute the instructions to operate a nodal network, wherein the instructions cause the one or more processors to:
store, for each of a plurality of nodes that form a part of the nodal network, a corresponding nodal location and a corresponding node level selected from a plurality of node levels, the nodal location corresponding to a value between a lower limit value and an upper limit value, wherein each node level corresponds to a different range of nodal distances between nodes of the nodal network;
store, for a given node, (i) a first pointer to a first node having a nodal location that is next in sequence to the given node, and (ii) a second pointer to a second node having a nodal location that is at a distance from the given nodal location of the given node, the distance being within a range of nodal distances of the given node level of the given node;
monitor activity that passes through the given node for information corresponding to a nodal path used to handle different communication requests involving other nodes in the nodal network; and
from monitoring the activity, update, for the given node, the second pointer to point to another node.

15. The computing device of claim 14, wherein each node that forms the part of the nodal network is sequenced based on the nodal location of each node.

16. The computing device of claim 14, wherein the instructions cause the one or more processors to monitor the activity by identifying, from the nodal path, nodal locations of each node that forms the part of the nodal network that handled information corresponding to the nodal path.

17. The computing device of claim 14, wherein the value of the nodal location that is between the lower limit value and the upper limit value, for each of a plurality of nodes that form a part of the nodal network, is a hash value.

18. The computing device of claim 14, wherein the instructions cause the one or more processors to update the second pointer to point to another node by updating the second pointer to point to a node having a nodal location that is at a smaller distance, than the distance of the second node, from the given nodal location of the given node.

19. The computing device of claim 14, wherein the instructions cause the one or more processors to monitor the activity by determining information of some but not all nodes in the plurality of nodes that form the part of the nodal network.

20. The computing device of claim 14, wherein one or more nodes of the plurality of nodes that form the part of the nodal network include three or more pointers.

* * * * *